United States Patent [19]
Sone et al.

[11] Patent Number: 5,835,178
[45] Date of Patent: Nov. 10, 1998

[54] LIQUID CRYSTAL DISPLAY DEVICE WITH PERIPHERY OF EXTERNAL ELECTRODES COVERED WITH ORIENTATION FILM FORMED WHERE EXTRACTION ELECTRODES ARE NOT FORMED

[75] Inventors: Takehiko Sone; Takashi Date; Manabu Kusano, all of Fukushima-ken, Japan

[73] Assignee: Alps Electric Co., Ltd., Japan

[21] Appl. No.: 889,802

[22] Filed: Jul. 8, 1997

[30] Foreign Application Priority Data

Jul. 17, 1996 [JP] Japan ................................. 8-187908

[51] Int. Cl.⁶ .................... G02F 1/1345; G02F 1/1337
[52] U.S. Cl. ......................... 349/149; 349/152; 349/123
[58] Field of Search .................................. 349/149, 152, 349/123, 126

[56] References Cited

U.S. PATENT DOCUMENTS 5,608,556  3/1997  Koma ........................................ 349/143

Primary Examiner—William L. Sikes
Assistant Examiner—Tarifur R. Chowdhury
Attorney, Agent, or Firm—Brinks Hofer Gilson & Lione

[57] ABSTRACT

A liquid crystal display device of the present invention comprises a first substrate and a second substrate, each of which has a glass substrate, an electrode portion formed on the glass substrate, and an orientation film formed on the electrode portion. The first substrate and the second substrate are opposed to each other and have a liquid crystal layer encapsuled therebetween. The electrode portion includes: a display-portion electrode group formed within a display-screen region; an extraction electrode group leading the display-portion electrode group outward from at least one side of the display-screen region; and an external electrode group formed outside the display-screen region. The periphery of the external electrode group, positioned on an external area of a side on which the extraction electrode group in the display-screen region is not formed, is covered with the orientation film.

4 Claims, 9 Drawing Sheets

LIQUID CRYSTAL DISPLAY DEVICE WITH PERIPHERY OF EXTERNAL ELECTRODES COVERED WITH ORIENTATION FILM FORMED WHERE EXTRACTION ELECTODES ARE NOT FORMED

BACKGROUND OF THE INVENTION

1. Field of the Invention

The present invention relates to a passive matrix liquid crystal display device such as a color STN liquid crystal display device.

2. Description of the Prior Art

Roughly speaking, a passive matrix liquid crystal display device is composed of a glass substrate (a first substrate) provided with transparent stripe electrodes formed in the x axis direction, another glass substrate (a second substrate) provided with transparent stripe electrodes formed in the y axis direction, and a liquid crystal layer sandwiched between the substrates.

FIGS. 6 to 10 show a conventional color STN liquid crystal display device. FIG. 6 is a plan view showing a part of the structure of a first substrate 31, and FIG. 7 is a plan view showing a part of the structure of a second substrate 32. FIGS. 8 to 10 show a liquid crystal cell composed of the first substrate 31, the second substrate 32, and a liquid crystal layer 33 provided therebetween. FIGS. 8, 9, and 10 are sectional diagrams taken along line VIII—VIII, line IX—IX, and line X—X, respectively, of FIGS. 6 and 7. A sealant 34 is also shown in the figures.

The first substrate 31 is prepared as follows: an electrode portion 42 is formed on a glass substrate 41, an insulating film layer 43 is formed thereon, and an orientation film 44 is formed on the insulating film layer 43. The electrode portion 42 is composed of transparent stripe electrodes including: a display-portion transparent electrode group 42a formed within a display screen region; extraction transparent electrode groups 42b leading the display-portion transparent electrode group 42a outward from two opposite sides of the display-screen region, and an external transparent electrode group 42c formed outside the display-screen region.

The second substrate 32 is prepared as follows: a color filter layer 55 is formed on a glass substrate 51, an over-coat layer 56 for planarizing and protecting is formed thereon, an electrode portion 52 is formed on the over-coat layer 56, and an orientation film 54 is formed thereon. The electrode portion 52 is composed of transparent stripe electrodes including: a display-portion transparent electrode group 52a formed within a display screen region; extraction transparent electrode groups 52b leading the display-portion transparent electrode group 52a outward from one side of the display-screen region, and an external transparent electrode group 52c formed outside the display-screen region.

The first and second substrates 31 and 32 are produced as follows: each of the layers such as the electrode portions is formed on the glass substrates 41 and 51, respectively, and then the orientation layers 44 and 54, i.e., the top layers, are rubbed. FIG. 11 is a diagram illustrating a rubbing process. In the figure, the reference numerals 61a, 61b, and 62 indicate a display-portion transparent electrode group, an extraction transparent electrode group, and an orientation film, respectively.

For example, the rubbing process is carried out as follows: electrode portions, orientation films 62, etc. corresponding to numerous display-screen regions are formed on a large glass substrate; and then a rubbing roll 60 having a surface of rayon, cotton, or the like is moved over the substrate while being rotated at a high speed so as to rub the orientation films 62 in a certain direction.

However, the above-mentioned liquid crystal display device has some non-uniform display problems including: white spots, in other words, portions of the screen are bright during normally black mode when the device is in an "on state", as is shown in FIG. 12; and black lines on the screen, as is shown in FIG. 13.

SUMMARY OF THE INVENTION

Accordingly, an object of the present invention is to prevent non-uniform display problems such as white spots and black lines on the screen of a passive matrix liquid crystal display device.

To achieve the above object, a liquid crystal display device of the present invention comprises a first substrate and a second substrate, each of which has a glass substrate, an electrode portion formed on the glass substrate, and an orientation film formed on the electrode portion. The first substrate and the second substrate are opposed to each other and have a liquid crystal layer encapsuled therebetween. The electrode portion includes: a display-portion electrode group formed within a display-screen region; an extraction electrode group leading the display-portion electrode group outward from at least one side of the display-screen region; and an external electrode group formed outside the display-screen region. The periphery of the external electrode group, positioned on an external area of a side on which the extraction electrode group in the display-screen region is not formed, is covered with the orientation film.

By employing the above-described structure, the area of the electrode portion exposed during the rubbing process to outside the orientation film can be minimized on the sides from which rubbing is started. As a result, non-uniform displaying is preventable in the liquid crystal display device.

Moreover, it is preferred that an insulating film layer is formed between the electrode portion and the orientation film of at least one of the first substrate and the second substrate and the periphery of the insulating film layer positioned outside the display-screen region is covered with the orientation film.

By employing the above-described structure, the insulating film layer is not exposed outside the orientation film during the rubbing process. As a result, non-uniform displaying is preventable in the liquid crystal display device.

Furthermore, either the first substrate or the second substrate may be provided with a color filter. The liquid crystal display device can thereby display colors.

As a result of various investigations conducted for finding causes of the white spots and black lines in color STN liquid crystal display devices, the inventors of the present invention have found that such non-uniform displaying relates to the conditions of films exposed on the substrate surface during the rubbing process.

DESCRIPTION OF THE PREFERRED EMBODIMENT

Figure 1:
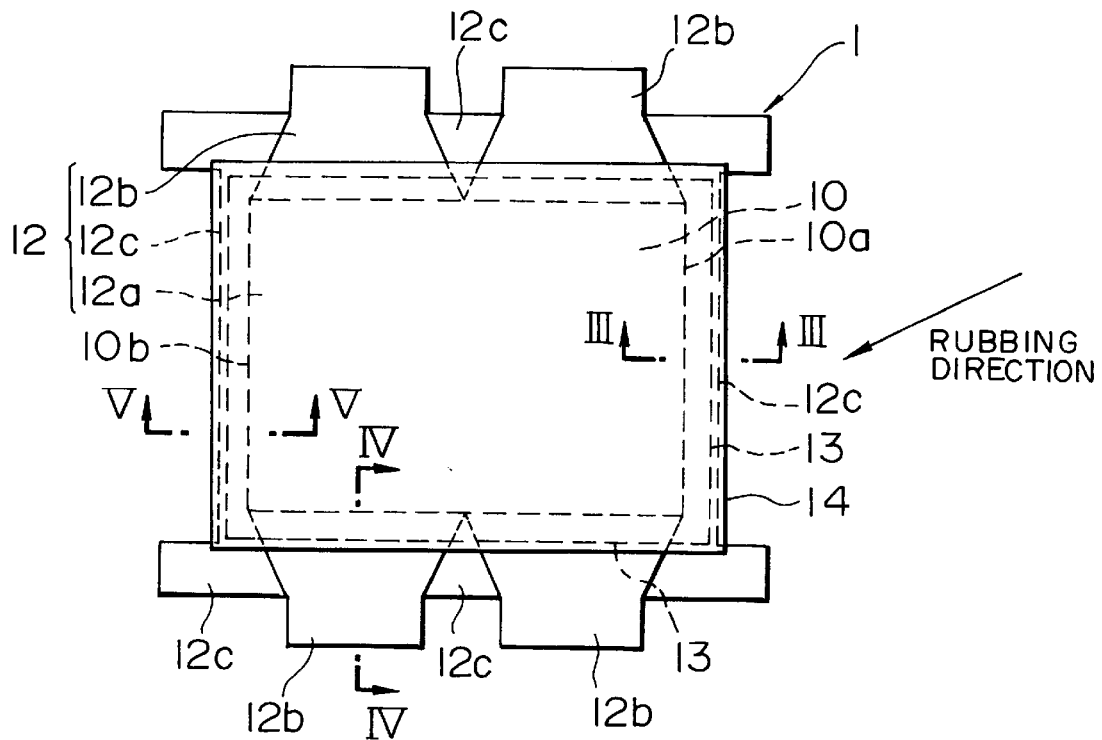
FIG. 1 is a diagrammatic plan view of a first substrate in a liquid crystal display device of an embodiment incorporated in the present invention.

Each of FIGS. 14 to 17 shows a display of a screen in a liquid crystal display device. In these figures, the conditions of films exposed on the substrate surface during the rubbing process are different from each other. Each of FIGS. 14A, 15A, 16A, and 17A is a diagrammatic plan view of a first substrate, each of FIGS. 14B, 15B, 16B, and 17B is a diagrammatic plan view of a second substrate, and each of FIGS. 14C, 15C, 16C, and 17C is a diagram of a screen. An electrode portion 61, a display-portion transparent electrode group 61a, a transparent extraction electrode group 61b, a transparent external electrode group 61c, an orientation film 62, and an insulating film layer 63 are shown in these figures. The arrow in each figure shows the rubbing direction.

Figure 14C:
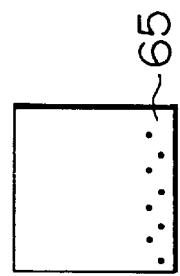
FIGS. 14A, 14B, and 14C are diagrammatic plan views of a first substrate, a second substrate, and a display screen, respectively, in a preliminary experiment conducted for the purpose of elucidating the cause of non-uniform displaying.
Figure 14B:
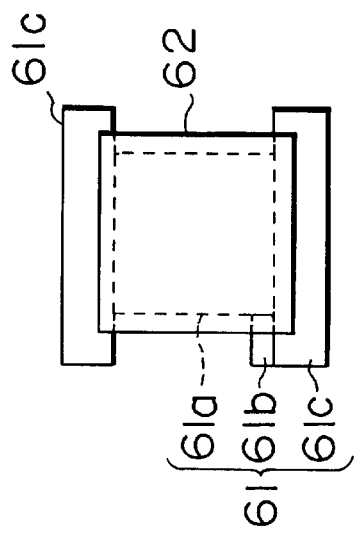
Figure 14A:
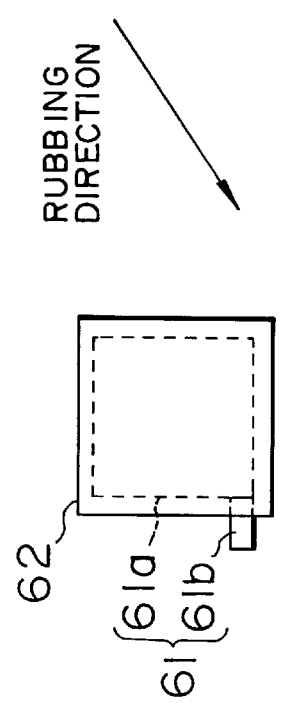

FIGS. 14A to 14C shows the first preliminary experiment. According to this experiment, the first substrate was composed of the electrode portion 61 formed on a glass substrate and the orientation film 62 provided on the electrode portion 61 without any insulating film layer. In the electrode portion 61, the external transparent electrode group was not formed and only the extraction transparent electrode group 61b was partially exposed outside the orientation film 62. Concerning the second substrate, the electrode portion 61 was formed on a glass substrate and the orientation film 62 was provided on the electrode portion 61 without any color filter layer or over-coat layer. Both external transparent electrode group 61c and extraction transparent electrode group 61b were partially exposed to outside the orientation film 62. In the above structure, pale white spots were observed on a lower portion of the display screen, as is shown in FIG. 14C.

Figure 15C:
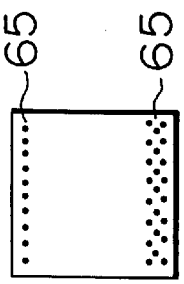
FIGS. 15A, 15B, and 15C are diagrammatic plan views of a first substrate, a second substrate, and a display screen, respectively, in another preliminary experiment conducted for the purpose of elucidating the cause of non-uniform displaying.
Figure 15B:
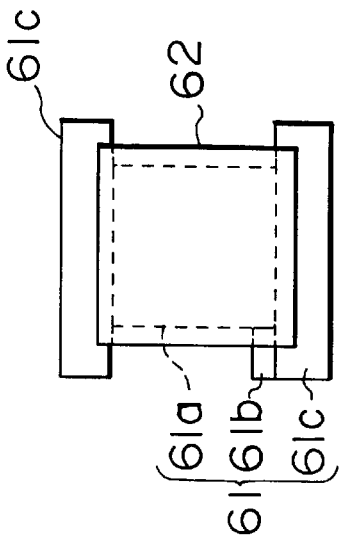
Figure 15A:
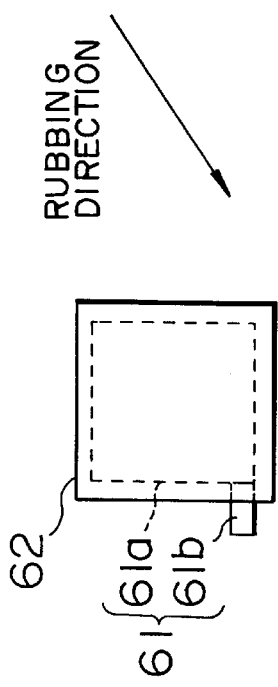

FIGS. 15A to 15C show the second preliminary experiment, in which the first substrate has the same structure as in the first preliminary experiment. A second substrate was prepared such that a color filter layer, an over-coat layer, the electrode portion 61, and the orientation film 62 were formed on a glass substrate in the above-given order. Both external transparent electrode group 61c and extraction transparent electrode group 61b were partially exposed outside the orientation film 62. In the above structure, pale white spots were observed on upper and lower portions of the display screen, as is shown in FIG. 15C. In particular, the white spots were remarkably seen in the lower portion of the screen.

Figure 16C:
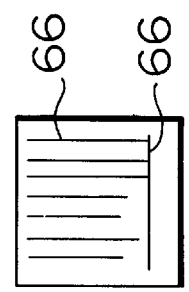
FIGS. 16A, 16B, and 16C are diagrammatic plan views of a first substrate, a second substrate, and a display screen, respectively, in still another preliminary experiment conducted for the purpose of elucidating the cause of non-uniform displaying.
Figure 16B:
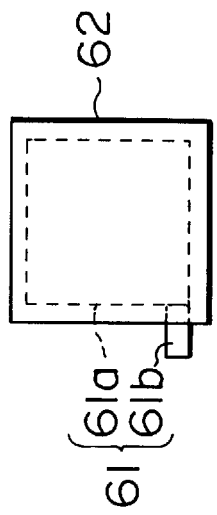
Figure 16A:
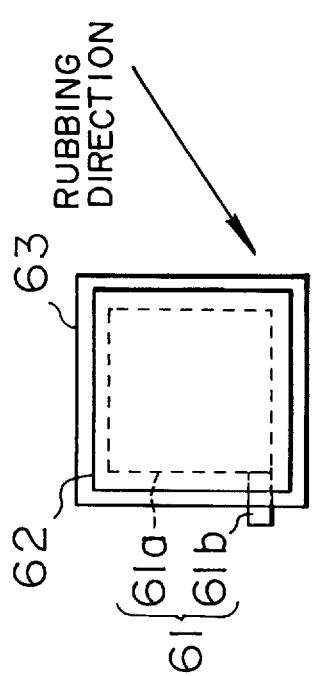

FIGS. 16A to 16C show the third preliminary experiment, in which a first substrate was composed of the electrode portion 61 formed on a glass substrate, the insulating film layer 63 provided on the electrode portion 61, and the orientation film 62 formed on the insulating film layer 63. The insulating film layer 63 was exposed in the periphery of the orientation film 62. A second substrate was prepared such that a color filter layer, an over-coat layer, the electrode portion 61, and the orientation film 62 were formed on a glass substrate in the above-given order. In the electrode portion 61, the external transparent electrode group was not formed and only the extraction transparent electrode group 61b was partially exposed outside the orientation film 62. In the above structure, vertical black lines with the same pitch were observed on an upper portion and a horizontal black line was seen on a lower portion of the display screen, as is shown in FIG. 16C.

Figure 17C:
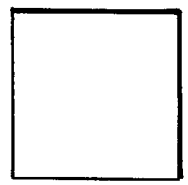
FIGS. 17A, 17B, and 17C are diagrammatic plan views of a first substrate, a second substrate, and a display screen, respectively, in another preliminary experiment conducted for the purpose of elucidating the cause of non-uniform displaying.
Figure 17B:
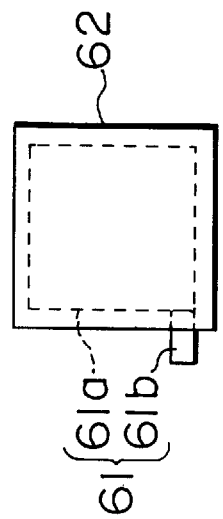
Figure 17A:
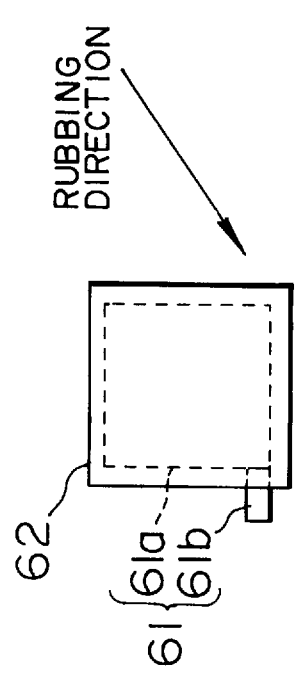

FIGS. 17A to 17C show the fourth preliminary experiment. Each of the first and second substrates had the electrode portion 61 formed on a glass substrate, and the orientation film 62 formed on the electrode portion 61 without any insulating film layer. In each electrode portion 61, the external transparent electrode group was not formed and only the extraction transparent electrode 61b was partially exposed outside the orientation film 62. In the above structure, uniform displaying was obtained in the screen without white spots or black lines, as is shown in FIG. 17C.

From the above results, the inventors of the present invention found the following and achieved the present invention: white spots readily appeared when the electrode portion 61 on a side from which rubbing was started was exposed outside the orientation film 62, and occurrence of white spots was particularly remarkable when a color filter layer and an over-coat layer were formed on the second substrate; and black lines were observed when the insulating film layer 63 on the first substrate was exposed outside the orientation film 62.

The present invention will be better understood from the following description of the preferred embodiments taken in conjunction with the accompanying drawings.

Figure 2:
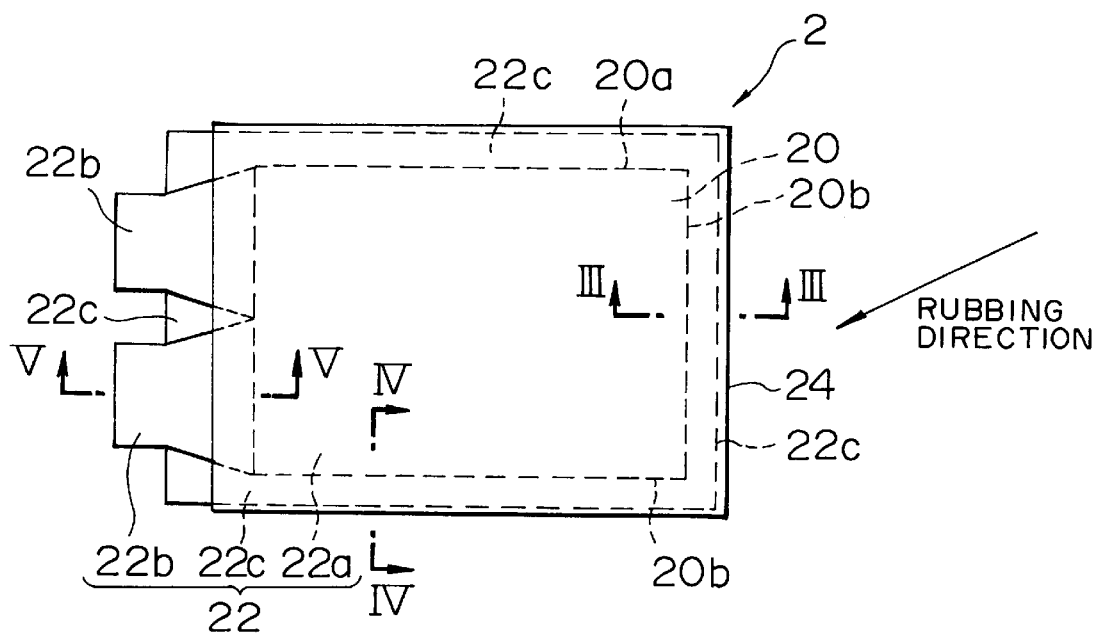
FIG. 2 is a diagrammatic plan view of a second substrate in a liquid crystal display device of an embodiment incorporated in the present invention.
Figure 3:
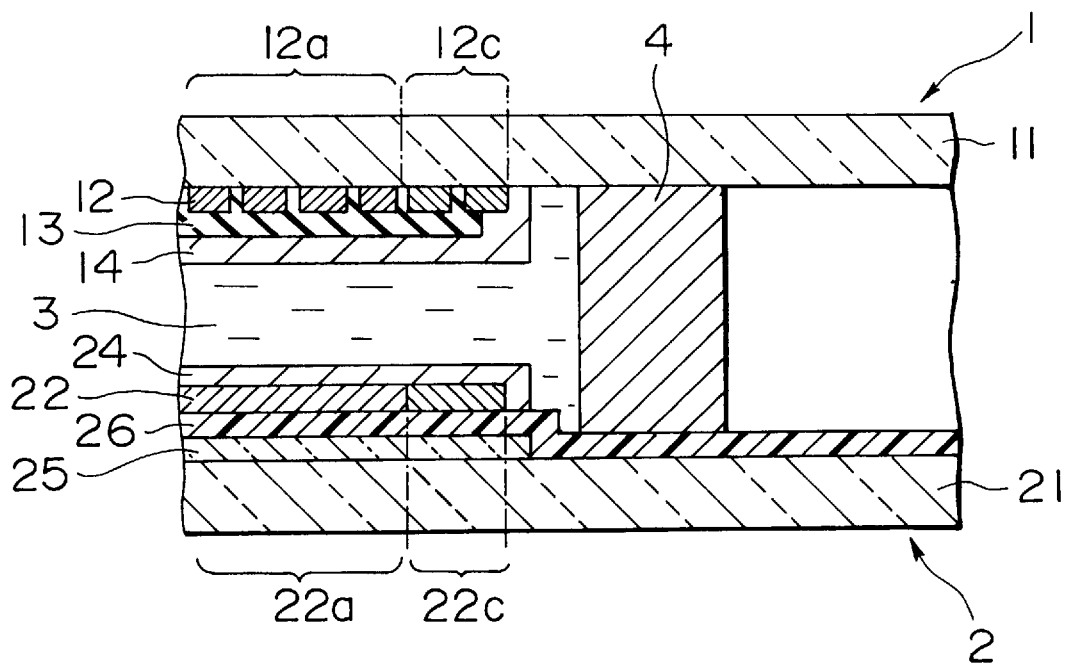
FIG. 3 is a sectional diagram taken along line III—III of FIGS. 1 and 2 showing an embodiment of a liquid crystal display device incorporated in the present invention.
Figure 4:
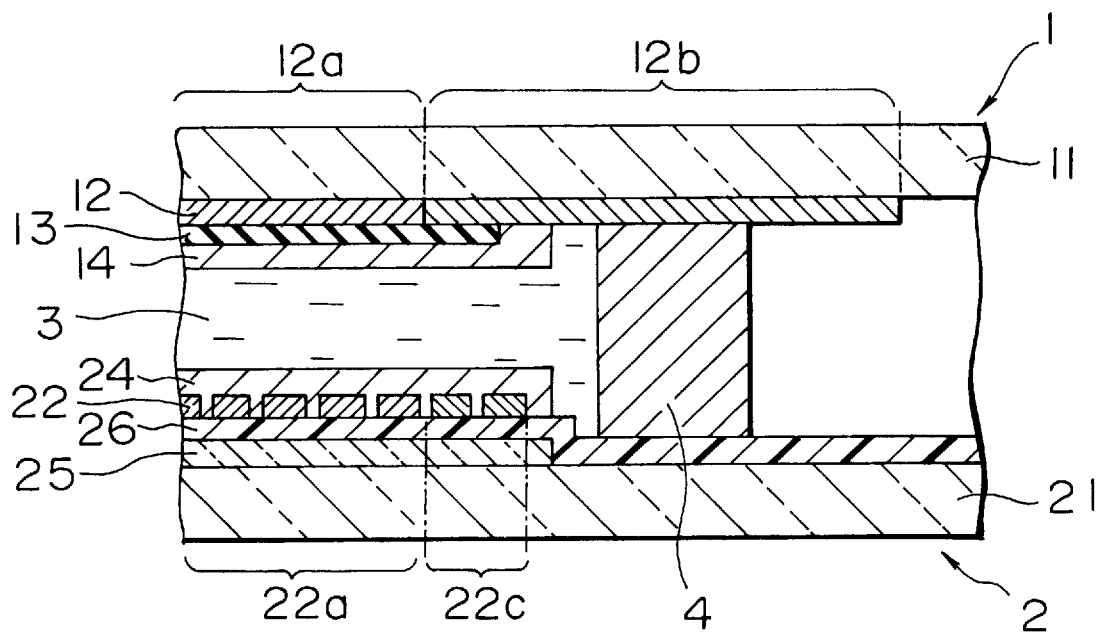
FIG. 4 is a sectional diagram taken along line IV—IV of FIGS. 1 and 2 showing an embodiment of a liquid crystal display device incorporated in the present invention.
Figure 5:
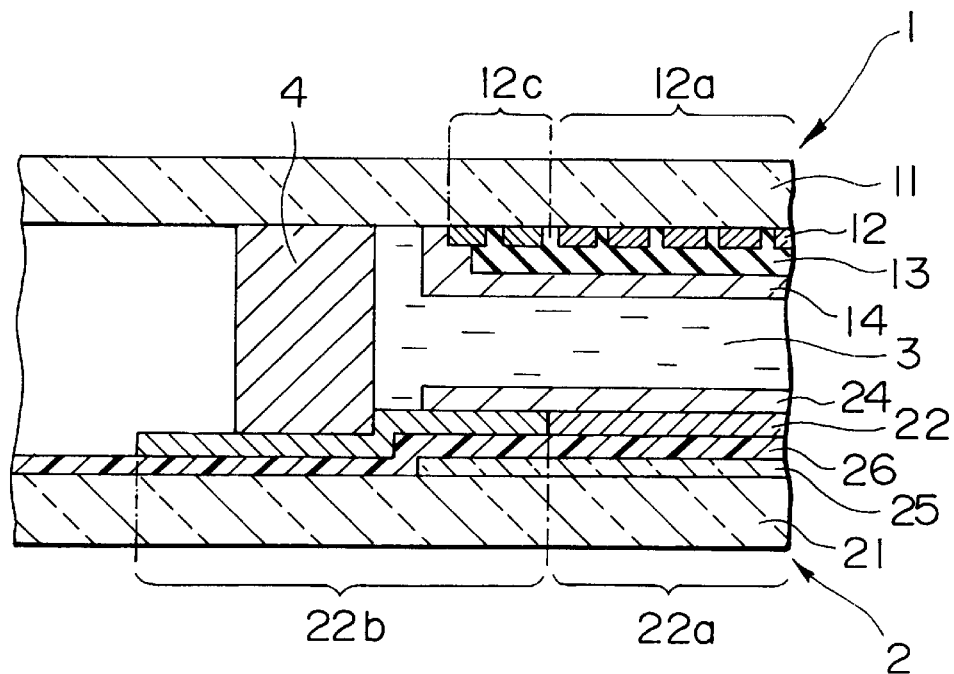
FIG. 5 is a sectional diagram taken along line V—V of FIGS. 1 and 2 showing an embodiment of a liquid crystal display device incorporated in the present invention.
Figure 6:
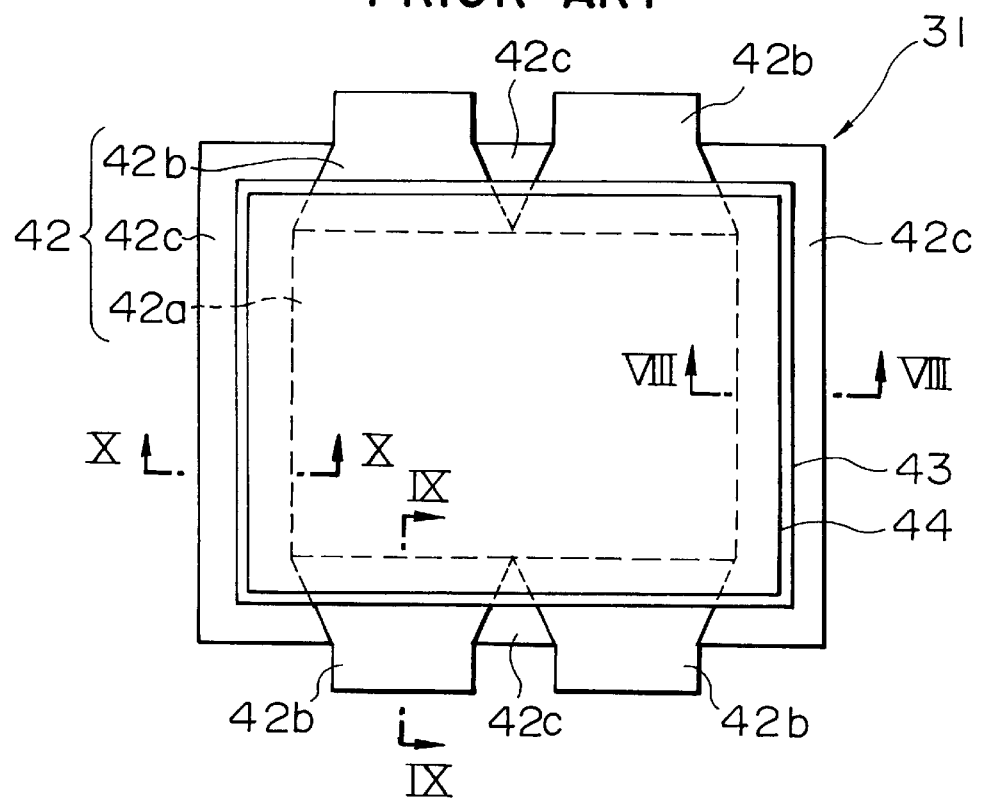
FIG. 6 is a diagrammatic plan view of a first substrate in a conventional liquid crystal display device.
Figure 7:
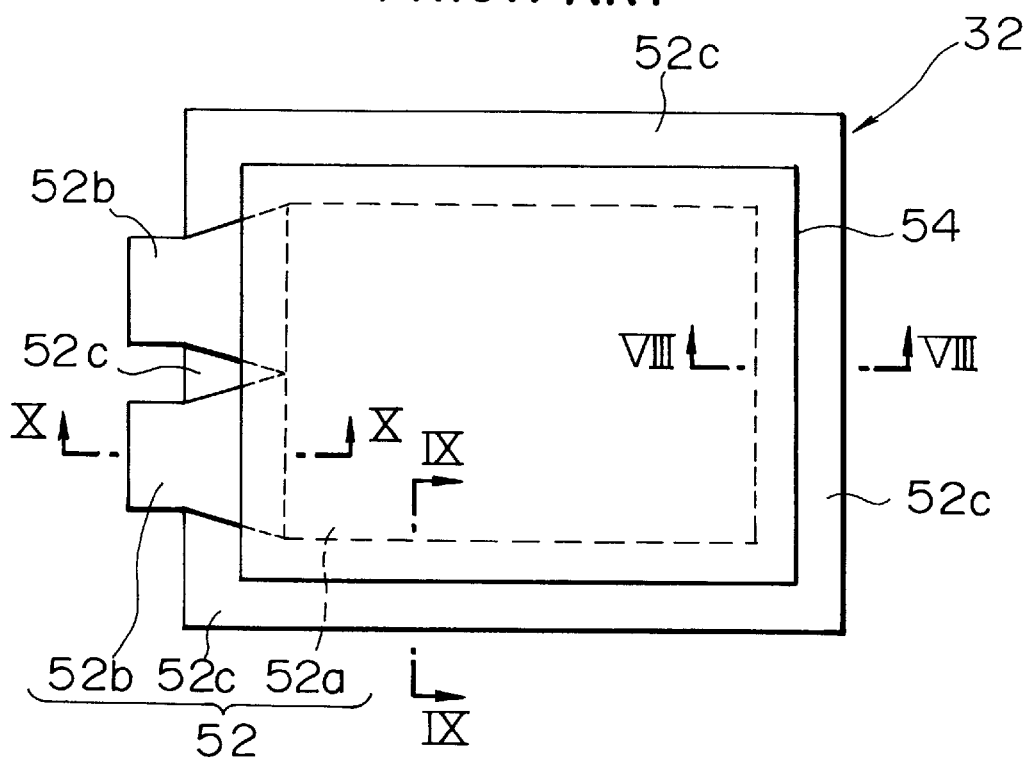
FIG. 7 is a diagrammatic plan view of a second substrate in a conventional liquid crystal display device.
Figure 8:
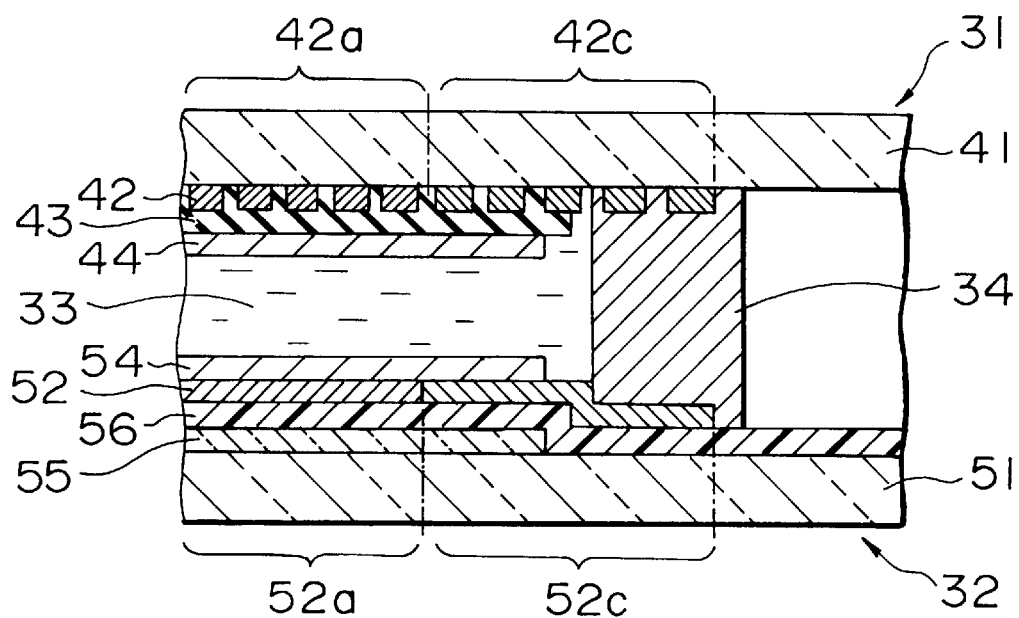
FIG. 8 is a sectional diagram taken along line VIII—VIII of FIGS. 6 and 7 showing a conventional liquid crystal display device.
Figure 9:
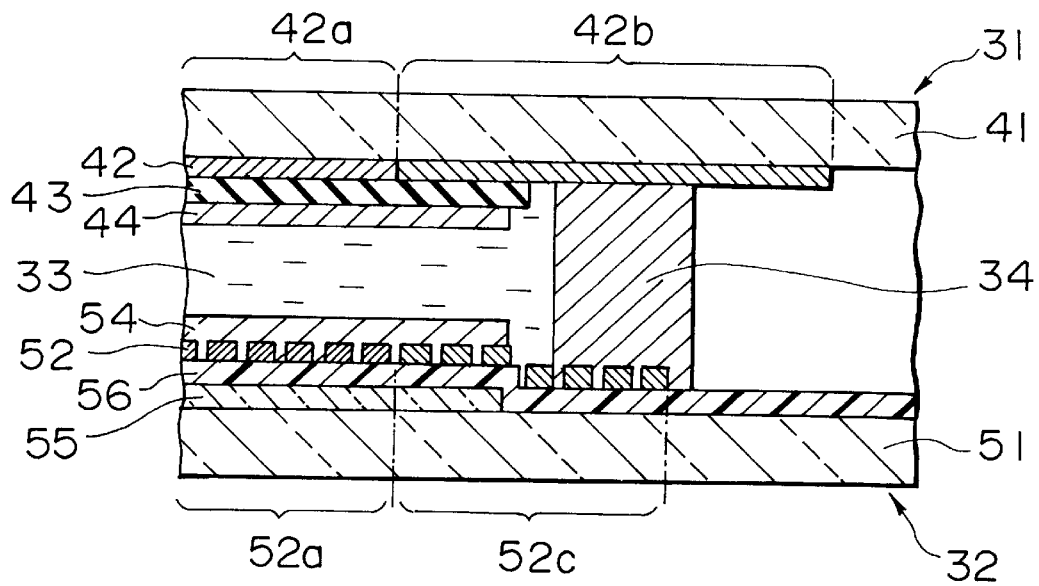
FIG. 9 is a sectional diagram taken along line IX—IX of FIGS. 6 and 7 showing a conventional liquid crystal display device.
Figure 10:
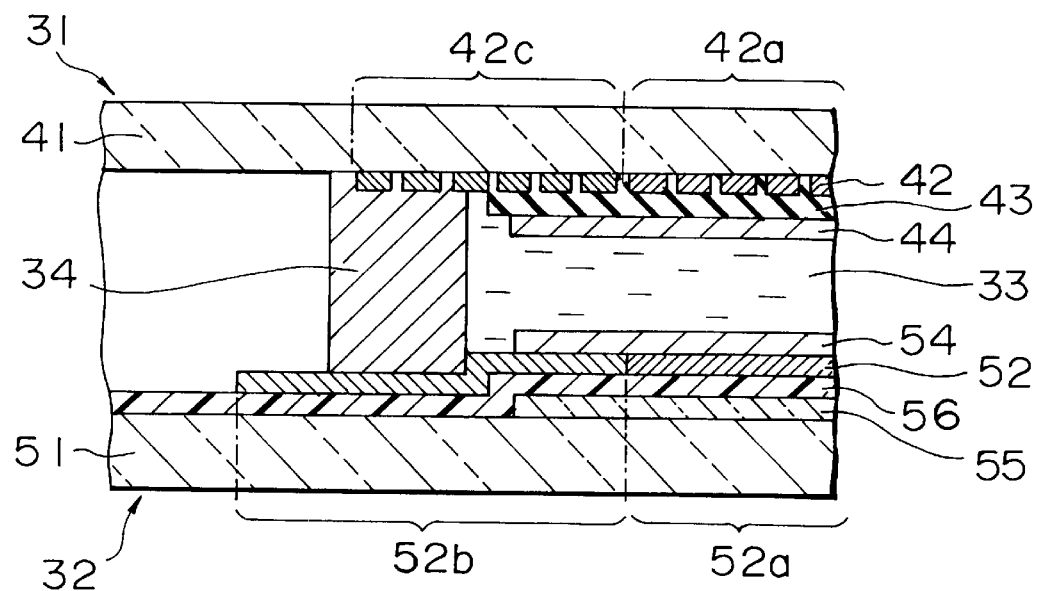
FIG. 10 is a sectional diagram taken along line X—X of FIGS. 6 and 7 showing a conventional liquid crystal display device.
Figure 11:
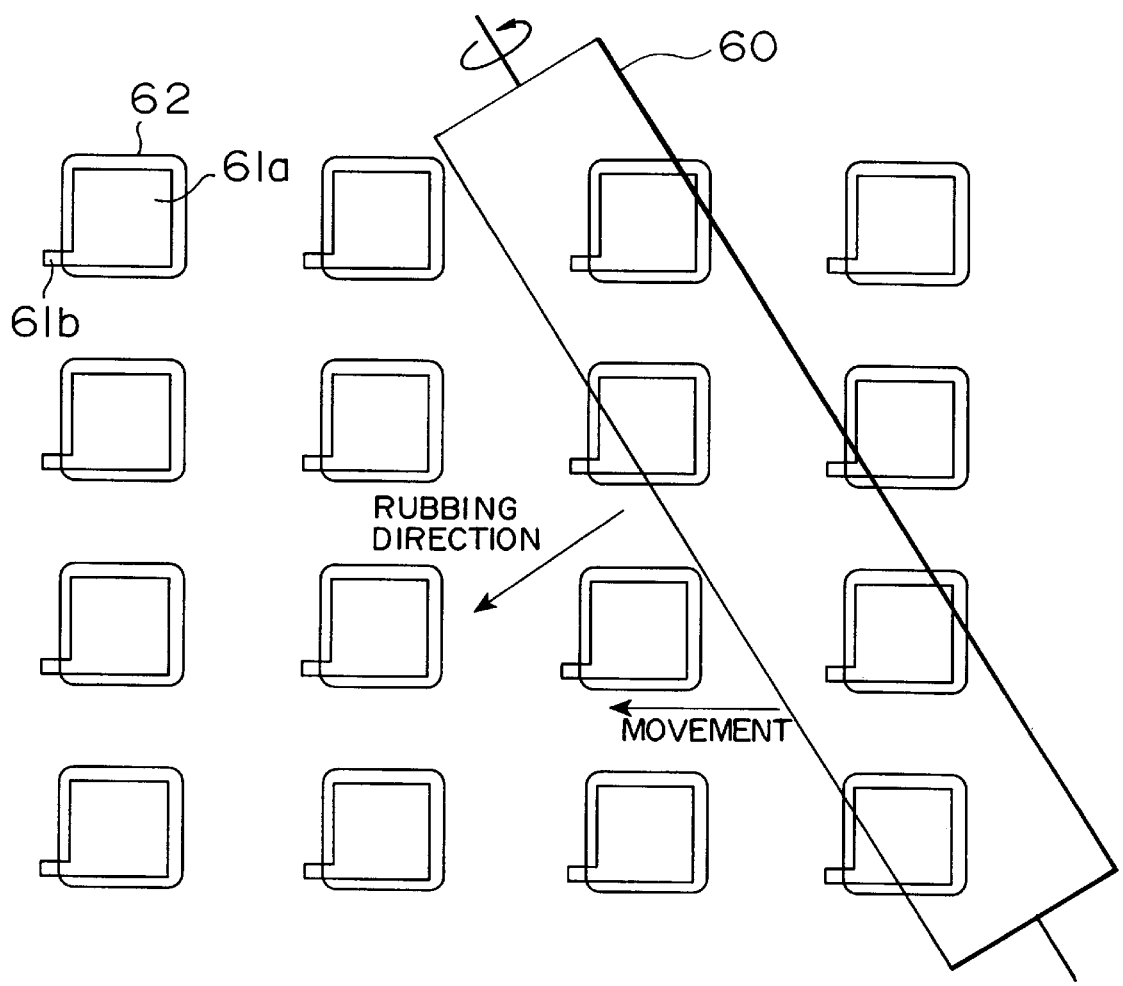
FIG. 11 is a diagram illustrating a rubbing process.
Figure 12:
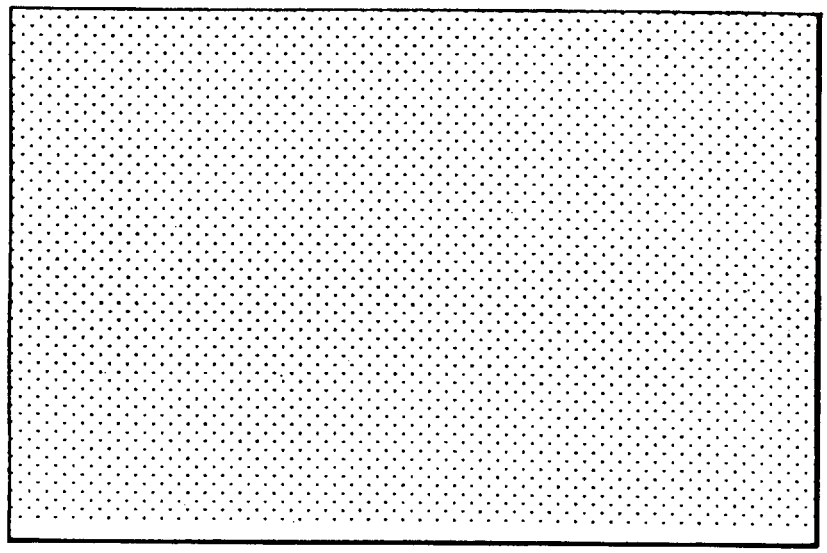
FIG. 12 is a diagrammatic plan view illustrating an example of non-uniform displaying in a liquid crystal display device.
Figure 13:
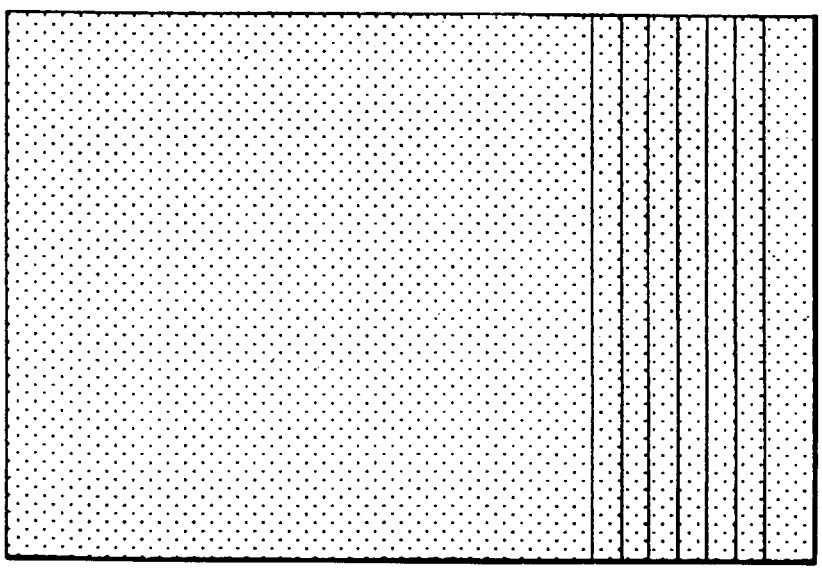
FIG. 13 is a diagrammatic plan view of another example of non-uniform displaying in a liquid crystal display device.

FIGS. 1 to 5 show an embodiment of a liquid crystal display device of the present invention. FIG. 1 is a plan view showing a part of the structure of a first substrate 1, and FIG. 2 is a plan view showing a part of the structure of a second substrate 2. FIGS. 3 to 5 are sectional diagrams of a liquid crystal cell composed of the first substrate 1, the second substrate 2, and a liquid crystal layer 3 provided therebetween. FIGS. 3, 4, and 5 are sectional diagrams taken along line III—III, line IV—IV, and line V—V, respectively, of FIGS. 1 and 2. A sealant 4 is also shown in the figures.

The first substrate 1 is prepared such that an electrode portion 12, an insulating film layer 13 (hereinafter referred to as "top-coat layer"), and an orientation film 14 are formed on a glass substrate 11 in the above-given order. The electrode portion 12 is composed of transparent stripe electrodes including: a display-portion transparent electrode group 12a formed within a display screen region 10; extraction transparent electrode groups 12b leading the display-portion transparent electrode group 12a outward from the two opposite sides of the display-screen region 10, and an external transparent electrode group 12c formed outside the display-screen region 10. The electrode portion 12 is preferably formed by etching an ITO film into a stripe form.

A polyimide film is preferably used as the orientation film 14 and subjected to the above-mentioned rubbing process after film-forming.

The top-coat layer 13 is formed from an insulating material such as $SiO_2$ or $ZrO_2$. Although a structure without the top-coat layer 13 may be employed for the present invention, advantageously, a short-circuit between the upper and lower electrodes due to extraneous matter or the like can be prevented by providing the top-coat layer 13 between the electrode portion 12 and the orientation film 14 of the first substrate 1.

According to this embodiment, the extraction transparent electrode group 12b is not formed on sides 10a and 10b, i.e., two of the four peripheral sides of the display screen region 10 in the first substrate 1. On the external areas of the sides 10a and 10b, the electrode portion 12 is covered with the orientation film 14, and the external edge of the electrode portion 12, that is, the external edge of the external transparent electrode group 12c, is positioned more internally as compared with the external edge of the orientation film 14.

The top-coat layer 13 is covered with the orientation film 14 and the external edge of the top-coat layer 13 is positioned more internally as compared with the external edge of the orientation film 14.

The second substrate 2 is prepared such that a color filter layer 25, an over-coat layer 26, an electrode portion 22, and an orientation film 24 is formed on a glass substrate 21 on the above-given order. The electrode portion 22 is composed of transparent stripe electrodes including: a display-portion transparent electrode group 22a formed within a display screen region 20; extraction transparent electrode groups 22b leading the display-portion transparent electrode group 22a outward from one side of the display-screen region 20, and an external transparent electrode group 22c formed outside the display-screen region 20. The electrode portion 22 is preferably formed by etching an ITO film into a stripe form.

A polyimide film is preferably used as the orientation film 24 and subjected to the above-mentioned rubbing process after film-forming.

A color filter layer in which black matrix and colors of R, G, and B are arranged according to various known methods is manufactured as the color filter layer 25. An over-coat layer 26 is formed on the color filter layer 25 for protecting and planarizing the surface of the color filter layer 25. The over-coat layer 26 is prepared from, for example, an acrylic resin.

When a liquid crystal display device does not display colors, the color filter layer 25 and the over-coat layer 26 are not required.

According to this embodiment, the transparent extraction electrode group 22b is not formed on the external areas of the sides 20a, 20b, and 20c, i.e., three of the four peripheral sides of the display screen region 20 on the second substrate 2. On the external areas of the sides 20a, 20b, and 20c, the electrode portion 22 is covered with the orientation film 24, and the external edge of the electrode portion 22, that is, the external edge of the external transparent electrode group 22c, is positioned more internally as compared with the external edge of the orientation film 24.

For manufacturing a liquid crystal display device of this embodiment, at first, two glass substrates are subjected to film-forming and patterning to prepare the first substrate 1 and the second substrate 2.

The resulting orientation films 14 and 24 are then rubbed by the above-mentioned rubbing roll 60 in a direction shown by the arrow in FIGS. 1 and 2, i.e., from the right upper to the left lower of the figures.

By applying a sealant 4 to the peripheries of the orientation films 14 and 24, the first substrate 1 and the second substrate 2 are joined together, preferably with spacers (not shown in the figures) provided between the substrates 1 and 2 to ensure a uniform distance therebetween. The first substrate 1 and the second substrate 2 are assembled such that the orientation films 14 and 24 face to the space formed between the substrates 1 and 2, and the transparent stripe electrode group of the substrate 1 and that of the substrate 2 are arranged to be perpendicular to each other.

After curing the sealant 4, a liquid crystal material is poured into the space between the first substrate 1 and the second substrate 2, and then, polarizers (not shown in the figures) are stuck to the outside of the substrates 1 and 2 to complete a liquid crystal cell.

A liquid crystal display device can be obtained as follows: the resulting liquid crystal cell is equipped with a mounting substrate having a driver LSI, a power circuit, etc. so that the extraction transparent electrode groups 12b and 22b of the cell are electrically connected to the driver LSI; and then the cell is assembled with a back light and a casing.

According to a liquid crystal display device of the present invention, the electrode portions 12 and 22 are designed as follows: the external transparent electrode groups 12c and 22c positioned on the peripheries of the display-screen regions 10 and 20 are covered with the orientation film 24, except for those positioned on the sides on which the extraction transparent electrode groups 12b and 22b are formed. The exposed areas of the electrode portions 12 and 22 positioned outside the orientation films 14 and 24, respectively, are thereby minimized on the sides from which rubbing is started. Thus, white spots are preventable in the display screen.

Moreover, by completely covering the top-coat layer 13 of the first substrate 1 with the orientation film 14, the top-coat layer 13 is not exposed outside the orientation film 14 during the rubbing process. Occurrence of black lines in the display screen is thereby prevented.

EXAMPLE

A color STN liquid crystal display device was produced using a liquid crystal cell having the structure shown in FIGS. 1 to 5.

A first substrate 1 was produced as follows: an ITO film was formed on a soda-lime-glass substrate 11 by sputtering, followed by etching to obtain an electrode portion 12. The thickness of the ITO film was 1,000 to 2,000 Å. On the ITO film, a top-coat layer 13 made of $ZrO_2$ or $SiO_2$ was formed by printing. The depth from the surface of the electrode portion 12 to that of the top-coat layer 13 was 500 to 1,000 Å. On the top-coat layer 13, an orientation film which was a polyimide film 14 was formed by printing. The depth from the surface of the top-coat layer 13 to that of the orientation film 14 was 500 to 1,000 Å. The orientation film 14 was then rubbed using a rayon rubbing roll.

The distance between the external edge of the orientation film 14 and the external transparent electrode group 12c was 0.1 to 0.6 mm and the distance between the external edge of the orientation film 14 and that of the top-coat layer 13 was 0.2 to 0.8 mm in the external areas of the sides 10a and 10b, i.e., the two sides of the display-screen region 10, in which external areas the extraction transparent electrode groups 12b were not formed.

A second substrate 2 was produced such that a color filter layer 25 was formed on a glass substrate 21 made of soda-lime glass and an over-coat layer 26 made of an acrylic resin was provided on the color filter layer 25. The depth from the surface of the glass substrate 21 to that of the over-coat layer 26 was 3 to 5 µm.

An ITO film was provided on the over-coat layer 26 by sputtering and formed into an electrode portion 22 by etching. The thickness of the ITO film was 1,000 to 3,000 Å. On the ITO film, an orientation film which was a polyimide film 24 was formed by printing. The depth from the surface of the electrode portion 22 to that of the orientation film 24 was 500 to 1,000 Å. The orientation film 24 was then rubbed similar to the first substrate 1.

The distance between the external edge of the orientation film 24 and the external transparent electrode group 22c was 0.1 to 0.6 mm in the external areas of the sides 20a, 20b, and 20c, i.e., the three sides of the display-screen region 20, in which external areas the extraction transparent electrode group 12b was not formed.

A color STN liquid crystal display device was produced using the resulting first and second substrates 1 and 2. Non-uniform displaying such as white spots or black lines did not appear in the display screen of the resulting liquid crystal display device.

As is described above, a liquid crystal display device of the present invention comprises a first substrate and a second substrate, each of which has a glass substrate, an electrode portion formed on the glass substrate, and an orientation film formed on the electrode portion. The first substrate and the second substrate are opposed to each other and have a liquid crystal layer encapsuled therebetween. The electrode portion includes: a display-portion electrode group formed within a display-screen region; an extraction electrode group leading the display-portion electrode group outward from at least one side of the display-screen region; and an external electrode group formed outside the display-screen region. The periphery of the external electrode group, positioned on an external area of a side on which the extraction electrode group in the display-screen region is not formed, is covered with the orientation film.

When an electrode portion is exposed during the rubbing process outside the orientation film on a side from which rubbing is started, the electrode portion is considered to cause white spots on the display screen. The exposed areas of the electrode portions positioned outside the orientation film during the rubbing process can be minimized by employing the above-described structure. As a result, white spots are preventable in the display screen of the liquid crystal display device.

Preferably, an insulating film layer is formed between the electrode portion and the orientation film of at least one of the first substrate and the second substrate, and the periphery of the insulating film layer positioned outside the display-screen region is covered with the orientation film.

A short-circuit between the upper and lower electrodes due to extraneous matter or the like can be advantageously prevented by providing an insulating film layer between the electrode layer and the orientation film.

Furthermore, black lines are supposed to appear when the insulating film layer is partially exposed outside the orientation film. By employing the above-mentioned structure, the insulating film layer is not exposed outside the orientation film during the rubbing process. Non-uniform displaying, such as black lines in the liquid crystal display device, can be thereby prevented.

Moreover, a color filter may be provided for either the first substrate or the second substrate to achieve color displaying in a liquid crystal display device.

What is claimed is:

1. A liquid crystal display device comprising a first substrate and a second substrate, each substrate comprising a glass substrate, an electrode portion formed on said glass substrate, and an orientation film formed on said electrode portion; said first substrate and said second substrate being opposed to each other and having a liquid crystal layer encapsuled therebetween; said electrode portion comprising a display-portion electrode group formed within a display-screen region, an extraction electrode group leading said display-portion electrode group outward from at least one side of said display-screen region, and an external electrode group formed outside said display-screen region; the periphery of said external electrode group, positioned on an external area of a side on which said extraction electrode group in said display-screen region is not formed, being covered with said orientation film.

2. A liquid crystal display device as set forth in claim 1, wherein an insulating film layer is formed between said electrode portion and said orientation film of at least one of said first substrate and said second substrate and the periphery of said insulating film layer positioned outside said display-screen region is covered with said orientation film.

3. A liquid crystal display device as set forth in claim 1, wherein either said first substrate or said second substrate is provided with a color filter.

4. A liquid crystal display device as set forth in claim 2, wherein either said first substrate or said second substrate is provided with a color filter.

* * * * *